US011604532B2

(12) United States Patent
Trapp et al.

(10) Patent No.: US 11,604,532 B2
(45) Date of Patent: Mar. 14, 2023

(54) OPERATING DEVICE FOR A VEHICLE

(71) Applicant: BEHR-HELLA THERMOCONTROL GMBH, Stuttgart (DE)

(72) Inventors: Ralph Trapp, Paderborn (DE); Michael Steinkamp, Lippstadt (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 147 days.

(21) Appl. No.: 17/053,252

(22) PCT Filed: May 7, 2019

(86) PCT No.: PCT/EP2019/061720
§ 371 (c)(1),
(2) Date: Nov. 5, 2020

(87) PCT Pub. No.: WO2019/215177
PCT Pub. Date: Nov. 14, 2019

(65) Prior Publication Data
US 2021/0237571 A1 Aug. 5, 2021

(30) Foreign Application Priority Data
May 7, 2018 (DE) ............. 10 2018 110 871.0

(51) Int. Cl.
*G06F 3/041* (2006.01)
*B60K 35/00* (2006.01)
*G06F 3/01* (2006.01)

(52) U.S. Cl.
CPC .......... *G06F 3/04146* (2019.05); *B60K 35/00* (2013.01); *G06F 3/016* (2013.01);
(Continued)

(58) Field of Classification Search
CPC .... G06F 3/016; G06F 3/0412; G06F 3/04142; G06F 3/0414; G06F 3/04144;
(Continued)

(56) References Cited

U.S. PATENT DOCUMENTS

2009/0102805 A1* 4/2009 Meijer ............... G06F 3/167
345/173
2010/0277431 A1 11/2010 Klinghult
(Continued)

FOREIGN PATENT DOCUMENTS

CN 207571989 U * 7/2018
DE 10 2013 006 174 A1 10/2014
(Continued)

OTHER PUBLICATIONS

International Search Report issued in corresponding International Application No. PCT/EP2019/061720 dated Aug. 9, 2019, with English translation.

Primary Examiner — Alexander Eisen
Assistant Examiner — Nathaniel P Brittingham
(74) Attorney, Agent, or Firm — BakerHostetler

(57) ABSTRACT

The invention relates to an operating device for a vehicle, comprising a display with a touch-sensor system for inputting a command and additionally a retaining device which retains the display. The retaining device has a base face and a free area which is defined by support elements protruding from the base face. The operating device is additionally provided with at least one actuation sensor for detecting a bend of the display upon being manually actuated and an analysis unit which is connected to the touch sensor system and the at least one actuation sensor for analyzing the signals of the touch sensor system and the at least one actuation sensor.

4 Claims, 2 Drawing Sheets

Figure 1:
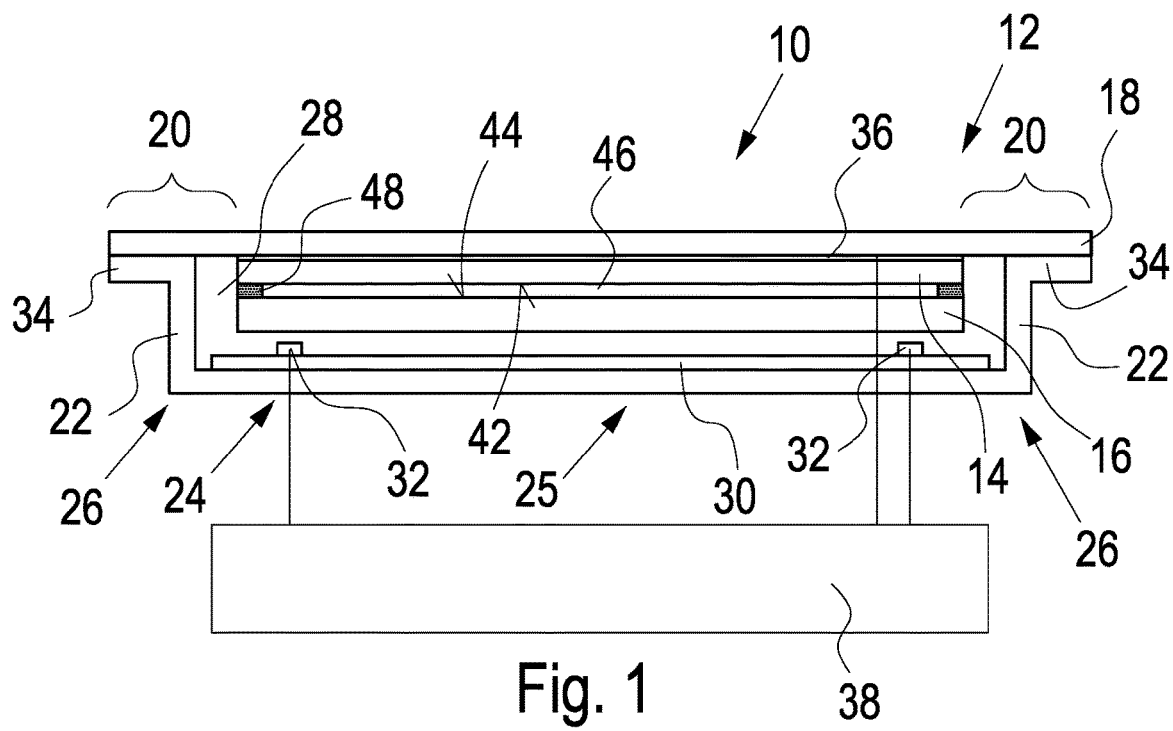

(52) U.S. Cl.
CPC .... *G06F 3/0412* (2013.01); *B60K 2370/1434* (2019.05); *B60K 2370/158* (2019.05); *B60K 2370/1533* (2019.05); *B60K 2370/691* (2019.05); *B60K 2370/692* (2019.05); *G06F 2203/04105* (2013.01)

(58) Field of Classification Search
CPC ....... G06F 3/04146; G06F 2203/04105; B60K 35/00; B60K 2370/691–692; B60K 2370/158; B60K 2370/1533; B60K 2370/1434
See application file for complete search history.

(56) References Cited

U.S. PATENT DOCUMENTS

| | | | |
|---|---|---|---|
| 2014/0168153 A1 | 6/2014 | Deichmann et al. | |
| 2016/0088133 A1* | 3/2016 | Kim .................... | G06F 3/0412 345/174 |
| 2017/0293377 A1 | 10/2017 | Hsu et al. | |

FOREIGN PATENT DOCUMENTS

| | | |
|---|---|---|
| DE | 10 2013 225 463 A1 | 6/2015 |
| EP | 3 040 826 A2 | 7/2016 |
| EP | 3 229 117 A2 | 10/2017 |
| WO | 2015/086589 A1 | 8/2015 |
| WO | 2017/172461 A1 | 10/2017 |

* cited by examiner

OPERATING DEVICE FOR A VEHICLE

CROSS REFERENCE

This application is the U.S. National Phase under 35 U.S.C. § 371 of International Application No. PCT/EP2019/061720 filed on May 7, 2019, which claims the benefit of German Application No. 10 2018 110 871.0 filed on May 7, 2018, the entire contents of each are hereby incorporated by reference.

The present patent application claims the priority of German Patent Application No-10 2018 110 871.0 filed on May 7, 2018, the content of which is hereby incorporated by reference into the subject matter of the present patent application.

The invention relates to an operating device for a vehicle, for example a vehicle component such as an air condition system, an infotainment system or a navigation system, and generally to a human-machine interface.

Displays in vehicles, which at the same time are input elements in the form of touch surfaces, are enjoying ever increasing use. With these touch displays that are already triggered by a slight touch, an accidental operation may possibly occur. If safety-relevant functions are triggered thereby or other unintentional adjustments of a vehicle function are caused, this may be problematic. In such cases, an additional sensor system is required by which the force with which the operator presses the corresponding region in the operating panel can be sensed or determined. In this manner, a triggering caused by mere contact is avoided. Since a demand for a rigid surface is frequently made, the sensor systems basically use force-sensitive resistors, strain gauges, optical or capacitive sensors. Here, the sensors typically measure a path traveled by the operating surface with respect to a rigid part of the component via the deflection of a spring element. For this purpose, the display surface is typically movably supported in the housing.

The principles described above require a complicated mechanism that allows the movement of the display relative to a rigid housing part. In addition, one or more spring elements are required, whereby the costs of the overall system are increased.

An operating device is known from WO-A-2017/172461 in which a local deformation of a display is sensed opto-electronically when the same is actuated manually with a certain pressing force.

It is an object of the present invention to provide an operating device for a vehicle whose structure for measuring the triggering force upon manual actuation of the display is simplified.

According to the invention the object is achieved with an operating device for a vehicle, comprising
  a display with a touch sensor system for a manual actuation of the display with a predeterminable minimum pressing force, for inputting a command,
  a retaining device which retains the display,
  the retaining device comprising a bottom side with edge portions and support elements protruding from at least opposite edge portions of the bottom side and define a free space between them, and
  the display is retained only by the support element of the retaining device and bridges the free space while maintaining a distance from the bottom side of the retaining device,
  at least one actuation sensor for sensing a bending of the display upon manual actuation thereof,
  the at least one actuation sensor (32) sensing a change in a distance of the display (12) from a reference plane or a change in a distance of a part of the display (12) from a reference plane, the change in distance being due to a bending of the display upon manual actuation thereof with the predeterminable minimum pressing force, and
  an evaluation unit connected to the touch sensor system and the at least one actuation sensor, for the evaluation of the signals of the touch sensor system and the at least one actuation sensor for the purpose of deciding, whether, upon a manual actuation of the display, the force acting on the display is at least the minimum pressing force.

Analogously, the invention provides that the display is bendably arranged on a retaining device of the actuation device. Thus, due to the reversible bending support of the display, the same moves upon manual actuation, i.e. when the display is acted upon with a pressing force. Even with a comparatively rigid, but still elastic support of the display an exertion of a pressing force on the display operating surface causes a "bending", i.e. a local change in distance of the display or a part of the display with respect to a reference plane or a reference point. Thus, the longer the path is that the display travels due to its elastic connection to the retaining device, the greater the pressing force acting on the display is. If a minimum path is detected upon a bending of the display, it can be decided that the actuation is a valid, i.e. intentional actuation of the display for the purpose of inputting a command. Determining the amount of the pressing force by distance measuring, as provided by the invention, is substantially less intricate than determining the bending of the display by optoelectric sensors as in prior art.

Besides being provided with a display unit, the display is advantageously provided with a cover plate with which the display unit is fixedly connected and which protrudes laterally beyond the display unit at least in the regions of the support elements, the cover plate resting on and being fixed (e.g. by bonding) to the support elements in these protrusion regions. The rigidity with which the display is elastically supported on the retaining device can be determined by the thickness, the material thereof and the length, as well as the width of the protrusion regions. Thus, the cover plate, which generally serves to mechanically protect the display unit of the display, is subjected to a bending when a force is exerted on the display upon manual actuation of the same, which bending is sensed, as described above, by the actuation sensor e.g. as a path traveled by the display because of the bending. The cover plate extends laterally beyond the display unit at least in those regions in which the display is supported on the support elements. The supporting support elements may form the edge portions of a frame of the retaining device which surrounds the display on all sides. In this case, the entire circumferential edge of the cover plate would be arranged to rest on the retaining device or its support elements and to be fixed thereon (e.g. by bonding). However, it is also conceivable that the cover plate protrudes beyond the display unit only at two, in particular opposite edges of the display unit of the display and is supported at the retaining device.

In a further suitable development of the invention it may be provided that the actuation sensor senses the bending of the cover plate and/or of the display unit.

The actuation sensor suitably is a path or force sensor. Using a path sensor, it is possible to conclude on the force which acts on the display when the same is actuated manually. If the rigidity, i.e. the spring elasticity, with which the display is connected to the retaining device is known, it is possible to conclude on the force from the length of the path by which the display is displaced. According to the invention, it is also possible to use one or a plurality of strain gauges or force-sensitive resistors.

In an advantageous development of the invention it may further be provided that the display has a rear side facing the bottom side of the retaining device and the actuation sensor senses the distance of the rear side of the display from the bottom side.

Suitable actuation sensors are in particular optical, capacitive, inductive and/or resistive sensors. The actuation sensor is preferably embodied as a micro-electromechanic or micro-optoelectromechanic element (MEMS, MOEMS).

In a further suitable development, it may be provided that a plurality of actuation sensors is provided which sense, at a plurality of points, a movement of the display as a result of bending upon manual actuation.

It may further be feasible for the display to have a rear side with a delimiting wall having a plurality of edge portions extending angularly with respect to each other, wherein a plurality of actuation sensors is provided, and the plurality of actuation sensors senses the movement of the display in those regions of the rear side in which two adjacent edge portions adjoin each other.

In other words, the subject matter of the invention according to one embodiment is a system which measures, at one or a plurality of points, the bending of the display assembly caused by finger pressure. For this purpose, one or a plurality of sensors is arranged e.g. on a component carrier which measure the bending of the display assembly at a plurality of points. In this manner, it is possible to conclude on the force acting on the display surface from the rigidity of the display assembly, and to do so for a predeterminable number of local regions of the display (e.g. for the operating panels of the display) so that a respective "path pattern" of the individual minimum displacement paths of the display assembly can be predetermined in advance for an almost optional number of positions on the display, which pattern must be given upon a later manual actuation of the display for the actuation to be detected as a valid actuation.

In this case, the display assembly is formed by a cover glass which protects the actual display and is connected to a housing. This is typically achieved by bonding. the display is attached on the rear side of the cover glass using an optically transparent bonding (so-called optical bonding). This display is usually formed by elements of a liquid crystal layer and the backlight (backlight unit).

When, with this arrangement, pressure is exerted on the cover glass, the same is deformed slightly This deformation is transmitted to a certain extend to the remaining components. This results in a displacement relative to the housing which can be measured through the sensors. This deformation strongly depends on where the force is induced into the cover glass and how great this force is. The position of the induction of force is determined by the touch sensor which is a part of the display or is installed as a separate sensor layer between the display and the cover glass. In knowledge of the display deformation occurring at different forces and positions, it is possible to conclude on the force by using one or a plurality of path measurement sensor. Since the display component and the cover glass have a certain rigidity, the deformation is very slight and will not be perceived by the user. Therefore, the sensors must have a high sensitivity. Depending on the number of force sensors, it is also possible to measure a plurality of force inductions caused by a plurality of fingers.

In a further embodiment of the invention it is assumed that the backlight unit of the display is arranged fixedly and immovably in the retaining device. This has the advantage that the elastically connected mass is reduced and is formed substantially by the masses of the display itself, i.e. the display unit, the touch panel and the cover glass.

The backlight unit (also referred to as backlight) can be connected to the display by optical bonding as will generally be the case in the above described first embodiment of the invention. Instead of an optical bonding, however, the backlight unit is generally connected to the display or the rear side of the display by means of a circumferential elastic sealing strip. The space between the light emitting side of the backlight unit and the rear side of the display is sealed to the outside by this circumferential sealing strip to prevent backlight leakage.

If the backlight unit is fixedly arranged in the retaining device, the elastic sealing strip still allows the display to bend when mechanical pressure is exerted on the display as is the case upon a manual actuation of the display. As described in the first embodiment, the actuation sensor can still sense a displacement or bending of the display relative to the bottom side of the retaining device which in this case represents the reference plane; however, it is also possible that the actuation sensor senses a change in distance between the display and the backlight unit. Here, it is possible that the actuation sensor is an integral part of the sealing strip, and thus a bending of the display is concluded from a compression of the sealing strip which is sensed at a plurality of points along the extension of the sealing strip. Again, it applies that the compression pattern to which the sealing strip is subjected by an actuation of the display, provides information about where the display surface was pressed with what force.

In a further advantageous development of both embodiments of the invention it may be provided that the operating device is provided with haptic feedback. The operating comfort is increased, if the detection of a valid operation of the operating panel is signaled to the user. Above all, this is advantageously effected by means of a tactile feedback. Such haptic feedback can be realized e.g. mechanically, electromechanically but also electrically. According to the invention the display is elastically connected with the retaining device. As such, a mechanical tactile feedback can be realized by mechanically exciting the display in the direction of the elastic connection using an actuator. This may be effected e.g. by the actuator moving the display in a pulse-like manner toward the bottom side of the retaining device and/or in the opposite direction. Another possible way of realizing a haptic feedback is to impress bending wave into the display or the cover glass. A further way of realizing the haptic feedback is a purely electrical variant using locally generated electric field.

In its most general form, the invention relates to an operating device for a vehicle, comprising
    a display with a touch sensor system for a manual actuation of the display with a predeterminable minimum pressing force, for inputting a command,
    a retaining device which retains the display,
    the retaining device comprising a bottom side with edge portions and support elements protruding from at least opposite edge portions of the bottom side and define a free space between them, and
    the display is retained only by the support element of the retaining device and bridges the free space while maintaining a distance from the bottom side of the retaining device, at least one actuation sensor for sensing a bending of the display upon manual actuation thereof, and the at least one actuation sensor sensing a change in a distance of the display from a reference plane or a change in a distance of a part of the display from a reference plane, the change in distance being due to a bending of the display upon manual actuation thereof with the predeterminable minimum pressing force.

Individual developments of the invention comprise one or a plurality of features alone or in any optional combination, such as they are listed hereunder in groups:

1. A device for realizing a force measuring device for determining the triggering force on a display operating unit, wherein the display operating unit is rigidly connected with a housing and wherein a component assembly with at least one sensor is mounted inside the housing, the sensor being configured to measure the bending of the display assembly relative to the housing upon an induction of force into the display assembly.
2. The device of item 1, wherein the sensors are configured as optical path measuring sensors.
3. The device of item 1 or 2, wherein the sensors are configured as capacitive path measuring sensors.
4. The device of one of items 1 to 3, wherein the sensors are configured as inductive path measuring sensors.
5. The device of one of claims 1 to 4, wherein the sensors are configured as so-called MEMS (micro-electromechanical sensors) in the form of an electronic component.
6. The device of one of points 1 to 5, wherein the sensors are arranged in the vicinity of the corners of the display (e.g. in the vicinity of the corners of the backlight).

Figure 2:
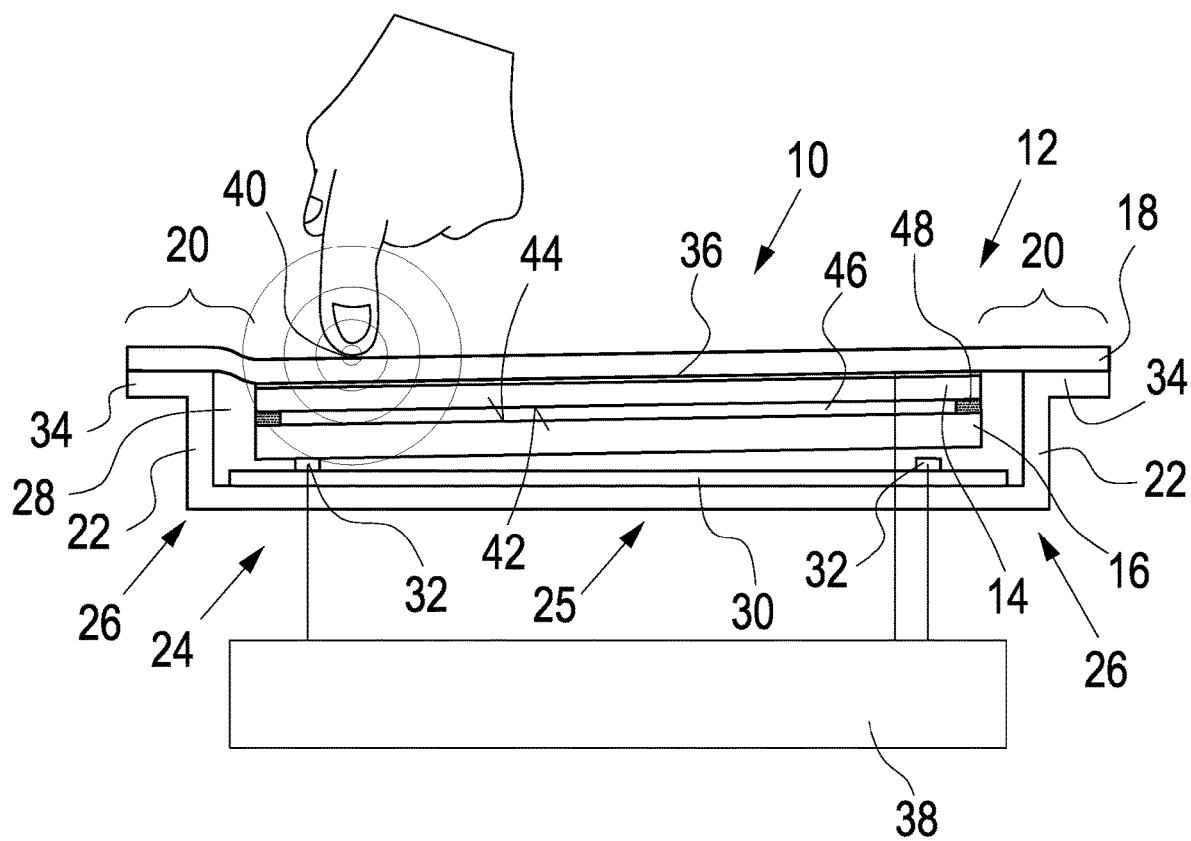
Figure 3:
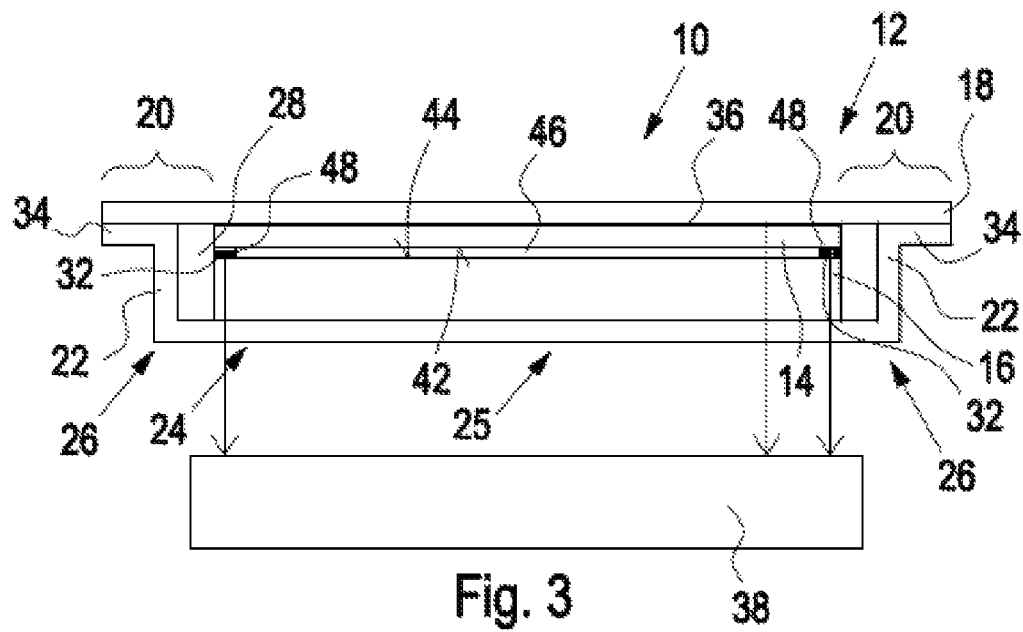
Figure 4:
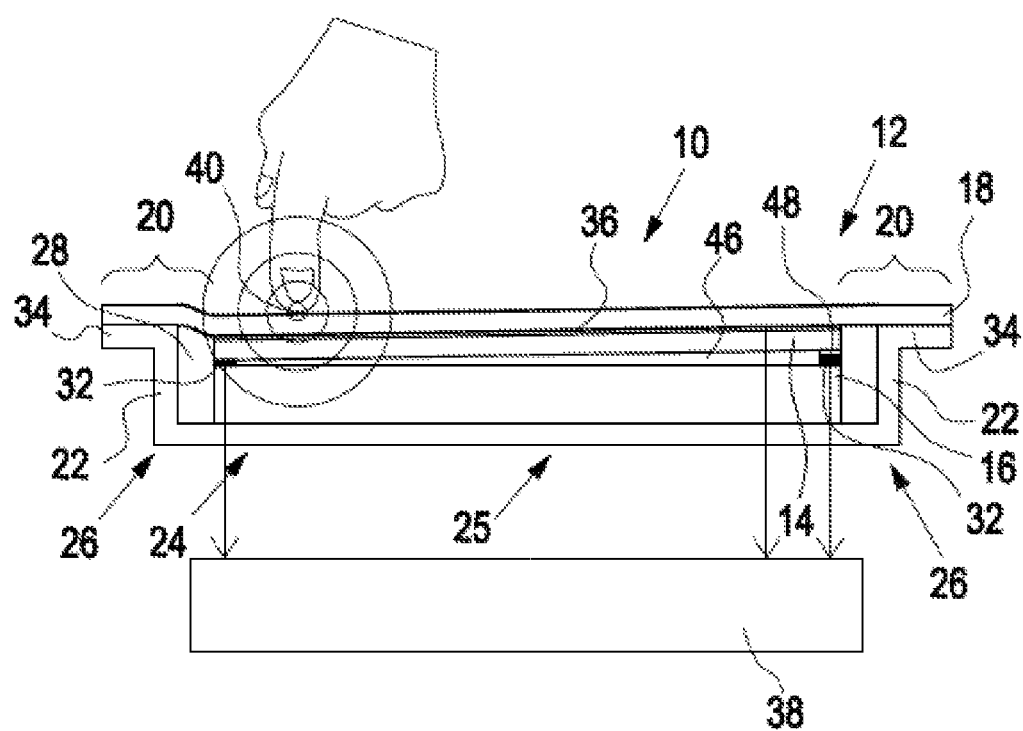

Two embodiments of the invention will be explained in more detail hereunder with reference to the drawing. Specifically, the Figures show:

FIG. 1 an illustration of a display of an operating device according to a first embodiment in a rest position, the display being elastically supported in the manner provided by the invention, FIG. 2 the display of FIG. 1 in a state of bending upon actuation of the display, the degree of bending being illustrated in a vastly exaggerated manner for the purpose of clarifying the functional principle of the invention, FIG. 3 an illustration of a display of an operating device according to a second embodiment in a rest position, the display being elastically supported in the manner provided by the invention, and FIG. 4 the display of FIG. 3 in a state of bending upon actuation of the display, the degree of bending being illustrated in a vastly exaggerated manner for the purpose of clarifying the functional principle of the invention.

FIG. 1 is a schematic illustration of a first embodiment of an operating device 10 for a vehicle (e.g. for use as a central input device arranged in the center console or in the dashboard. The operating device 10 comprises a display 12 with a display unit 14 implemented e.g. in LCD technology and a backlight unit 16. The display unit 12 further comprises a cover plate 18 which, as illustrated in FIG. 1, protrudes beyond the display unit 14 at at least two opposite edges or ends. in these protrusion regions 20, the cover plate 18 rests on support elements 22 of a retaining device 24 which in the present embodiment is provided with a bottom wall as a bottom side 25 from which the support elements 22 protrude upward from at least two opposite edge portions 26.

Due to the above described structure, the display thus spans the free space 28 of the retaining device 24 defined by the supporting elements 22.

The retaining device 24 does not necessarily require a continuous bottom wall; the bottom side 25 may also be formed as an opening and thus as an open bottom side of the retaining device 24.

In any a path or force sensor system in the form of preferably a plurality of actuation sensors 32 is located below the display 12 e.g. on a circuit board or a similar carrier plate 30, which sensors operate in particular optically, capacitively, inductively and/or resistively.

The cover plate 18 is fastened e.g. to flanges 34 of the support elements 22 (e.g. by bonding). The display unit is fixedly connected with the bottom side of the cover plate 18, suitably by means of a transparent adhesive (so-called optical bonding. The display 12 further includes a touch sensor system 36 (e.g. a touch panel).

If, as indicated in FIG. 2, pressure is exerted on the cover plate 18, as is the case upon manual actuation of the display 12, the protrusion regions 20 of the cover plate 18 are subjected to a bending in their regions between the support element 22 and the display unit 14. As a result, the display moves towards the bottom side 24 of the retaining device so that the manual actuation of the display is detected from a change (i.e. in this case, a reduction) in distance. This change in distance differs at the plurality of points at which it is sensed by the plurality of actuation sensors 32, the difference depending on the manually applied pressing force and the location on the cover plate 18, i.e. on the display 12, where it is exerted.

The touch sensor system 36 and the actuation sensors 32 supply their data to an evaluation unit 8 in which an evaluation can be made as to whether the force required for a valid, i.e. intentional actuation of the display 12 is exerted manually on the display 12 at the point of actuation (see FIG. 2 at 40) localized by the touch sensor system 36. This force is reached when the actuation sensors 32 detect corresponding movements at their associated "measuring points" of the display 12.

In the above described embodiment, the backlight unit 16 "hangs" under the display unit 14, i.e. on the rear side 42 of the display 12. The backlight unit 16 has a light emitting side 44 facing the rear side 42. Generally, a space 46 exists between the light emitting side 44 and the rear side 42, which space is optically sealed to the outside by an elastic sealing strip 48. Thereby, backlight from the backlight unit 16 cannot leak laterally from the space 46.

If the backlight unit 16 hangs under the display 12 without being supported on the retaining device 24, this connection of the backlight unit 16 with the display 12 via the sealing strip 48, which insofar is an elastic connection, can be caused to move unintentionally due to vibrations acting from outside.

In a second embodiment illustrated in FIGS. 3 and 4, the operating device 10' is therefore modified with respect to the arrangement and support of the backlight unit 18. As far as the elements of the operating device 10' are alike in structure or function to the elements of the operating device 10 in FIGS. 1 and 2, they are identified by the same reference numerals in FIGS. 3 and 4 as in the case of the operating device 10.

In the embodiment of the operating device 0' of FIGS. 3 and 4, the backlight unit 16 is supported on the bottom side 25 of the retaining device 24 and is thus substantially immovable. If, for example, force is exerted on the display 12 at the point 40, the display 12 is displaced while the sealing strip 48 is compressed. Furthermore, it is possible to metrologically detect this displacement relative to the bottom side 25 of the retaining device 24, i.e. by the actuation sensors 32. Likewise, it is also possible to detect the displacement or offset of the display 12 with respect to the light emitting side 44 of the backlighting unit of the backlight unit 16. The actuation sensors 32 are then arranged in the space 46 between the rear side 42 of the display 12 and the light emitting side 44 of the backlight unit 16 and measure a change in the distance between both sides. As an alternative, it is possible to integrate the actuation sensor system into the sealing strip 48. This may be achieved e.g. by a resistive sensing of a compression (possibly locally) of the sealing strip 48. However, the sealing strip 48 may also be provided with a plurality of measuring points. Instead of resistive sensors, it is also possible in this case to implement capacitive sensors (the sealing strip 48 acts e.g. as a dielectric which changes upon compression) or inductive sensors.

The concept of the present invention operates without complex spring mechanisms. The elastic and still rigid connection is realized solely in a simple manner by "suspending" the display 12 by means of the cover plate 18 which spans the free space 28 of the retaining device 24 and is thus subjected to bending in the protrusion regions protruding laterally beyond the display unit 14, when a force is exerted on the display 12. The resultant bending can be detected and the exerted force can be concluded therefrom. If the minimum pressing force is reached or exceeded, an intentional actuation of the display is given.

LIST OF REFERENCE NUMERALS 10 operating device
12 display
14 display unit of the display
16 backlight unit
18 cover plate of the display
20 protrusion regions of the cover plate
22 support element of the retaining device
24 retaining device
25 bottom side of the retaining device
26 edge portions of the bottom side
28 free space in the retaining device
30 carrier plate
32 actuation sensor
34 flanges of the support elements
36 touch sensor system of the display
38 evaluation unit
40 pressure exertion point on the display
42 rear side of the display
44 light emitting side of the backlight unit
46 space between the display and the backlight unit
48 sealing strip

The invention claimed is:

1. An operating device for a vehicle, comprising
a display with a touch sensor system for a manual actuation of the display with a predeterminable minimum pressing force, for inputting a command,
a retaining device which retains the display,
the retaining device comprising a bottom side with at least opposite edge portions and support elements protruding from the at least opposite edge portions of the bottom side and defining a free space therebetween, and
the display is retained only by the support elements of the retaining device and bridges the free space while maintaining a distance from the bottom side of the retaining device,
at least one actuation sensor for sensing a bending of the display upon a manual actuation thereof,
the at least one actuation sensor sensing a change in distance of the display from a reference plane, the change in distance being due to the bending of the display upon a manual actuation thereof with the predeterminable minimum pressing force, and
a backlight unit, comprising a light emitting side, arranged in the retaining device and facing a rear side of the display by the light emitting side,
wherein the backlight unit is arranged on the bottom side of the retaining device, and the at least one actuation sensor senses a change in distance between the rear side of the display and the light emitting side of the backlight unit, and
wherein the at least one actuation sensor is integrated into the sealing strip, and senses the change in distance between the rear side of the display and the light emitting side of the backlight unit, based on a compression of the sealing strip upon a manual actuation of the display.

2. The operating device according to claim 1, wherein the display comprises a display unit and a cover plate with which the display unit is fixedly connected and which protrudes laterally beyond the display unit at least in regions of the support elements, and wherein the cover plate rests on the support elements in these protrusion regions.

3. The operating device according to claim 1, wherein the at least one actuation sensor is a path or force sensor and/or operates optically, capacitively, inductively and/or resistively and/or is configured as a micro-electromechanical or micro-optoelectromechanical element.

4. The operating device according to claim 1, characterized by an electric or electromechanics or electromagnetic feedback unit for a tactile feedback of a valid manual actuation of the display.

* * * * *